United States Patent
Ito et al.

(10) Patent No.: US 7,604,869 B2
(45) Date of Patent: Oct. 20, 2009

(54) OLEFINIC THERMOPLASTIC ELASTOMER LAMINATE

(75) Inventors: Yuichi Ito, Ichihara (JP); Ryoji Mori, Sodegaura (JP); Takashi Nakagawa, Sodegaura (JP); Masakazu Jitsukata, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 369 days.

(21) Appl. No.: 10/581,344

(22) PCT Filed: Oct. 29, 2004

(86) PCT No.: PCT/JP2004/016142

§ 371 (c)(1),
(2), (4) Date: Jun. 2, 2006

(87) PCT Pub. No.: WO2005/053951

PCT Pub. Date: Jun. 16, 2005

(65) Prior Publication Data
US 2007/0172683 A1    Jul. 26, 2007

(30) Foreign Application Priority Data
Dec. 5, 2003    (JP)    ............................. 2003-408242

(51) Int. Cl.
*B32B 27/08*    (2006.01)

(52) U.S. Cl. ...................................... 428/515; 428/516

(58) Field of Classification Search ....................... None
See application file for complete search history.

(56) References Cited

U.S. PATENT DOCUMENTS 5,362,572 A    11/1994    Hamada
6,632,885 B2 *    10/2003    Morizono et al. ........... 525/191

FOREIGN PATENT DOCUMENTS

| EP | 1 080 882 A2 | 3/2001 |
|---|---|---|
| JP | 3-70742 | 11/1991 |
| JP | 2002-97323 A | 4/2002 |
| JP | 2003-311886 A | 11/2003 |

* cited by examiner

*Primary Examiner*—Sheeba Ahmed
(74) *Attorney, Agent, or Firm*—Foley & Lardner LLP

(57) ABSTRACT

The present invention proposes a molded product having excellent moldability and ability to be processed into parts, as well as excellent scratch resistance.

The invention provides a multilayered laminate composed of two or more layers, having a structure in which a layer (I) comprising at least one selected from an olefinic thermoplastic elastomer composition (A) and an olefinic resin (B), and a layer (II) comprising an olefinic thermoplastic elastomer composition (C) are laminated. The olefinic thermoplastic elastomer composition (C) is a composition comprising [1] a specific syndiotactic polypropylene copolymer (c), and [2] at least one selected from a polypropylene resin (d) and an olefinic thermoplastic elastomer (e).

9 Claims, No Drawings

OLEFINIC THERMOPLASTIC ELASTOMER LAMINATE

TECHNICAL FIELD

The present invention relates to an olefinic thermoplastic elastomer laminate.

BACKGROUND ART

Heretofore, vinyl chloride resins have been widely used for interior furnishings and exterior furnishings of automobile. Vinyl chloride resins have an excellent ability to be molded and processed into parts and are of relatively low prices, thus being used for many purposes such as instrumental panels, interior skin material such as for door, ceiling, material for steering wheel, lever knobs, various grips and glass runs, weather strips, various moldings such as window molding, roof molding, side molding and the like. However, in recent years, vinyl chloride resins have been pointed out for its possibility of causing generation of chlorine gases upon incineration, and thus studies are being conducted on switching from them to materials other than vinyl chloride resins for the above-mentioned parts.

In particular, the most widely used material as a replacement of the vinyl chloride resin for automobile interior furnishings is an olefinic thermoplastic elastomer. The olefinic thermoplastic elastomer material is an excellent material in the aspects of being lightweight, having excellent moldability and ability to be processed into parts, being highly recyclable and of not generating harmful gases upon combustion and so on. However, on the other hand, the material has a defect of having poor scratch resistance.

Thus, in practice, olefinic thermoplastic elastomers are not used as received in most cases for the parts where scratch resistance is required, and those acquiring improved scratch resistance at the surface through surface treatment or the like, are used (for example, Patent Document 1).

[Patent Document 1] JP-B No. 3-070742

DISCLOSURE OF THE INVENTION

Problems to be Solved by the Invention

It is an object of the present invention to solve the above-mentioned problems associated with conventional technology, and to suggest a molded product having excellent moldability and ability to be processed into parts as well as excellent scratch resistance, by laminating an olefinic thermoplastic elastomer having excellent scratch resistance on a conventional olefinic thermoplastic elastomer.

Means for Solving the Problem

The olefinic thermoplastic elastomer laminate of the invention is a multilayered laminate composed of two or more layers, which has a structure in which the layer (I) comprising at least one selected from an olefinic thermoplastic elastomer composition (A) and an olefinic resin (B), and the layer (II) comprising an olefinic thermoplastic elastomer composition (C) are laminated, wherein the olefinic thermoplastic elastomer composition (A) is an olefinic thermoplastic elastomer composition containing an olefinic resin (a) and an ethylenic copolymer rubber (b), and the olefinic thermoplastic elastomer composition (C) is an olefinic thermoplastic elastomer composition containing the following [1] and [2], wherein [1] is a syndiotactic polypropylene copolymer (c) containing.

(c-1) a repeating unit derived from propylene, and (c-2) a repeating unit derived from at least one olefin selected from olefins having 2 to 20 carbon atoms excepting propylene, such that the copolymer (c) contains 99 to 50% by mole of unit (c-1) and 1 to 50% by mole of unit (c-2) when the total amount of unit (c-1) and unit (c-2) is 100% by mole, and if desired, further containing (c-3) a repeating unit derived from polyene in an amount of 0 to 30% by mole, relative to 100% by mole of the total amount of unit (c-1) and unit (c-2), which has a crystallinity degree of less than 20% as obtained by X-ray diffraction, and has a substantially syndiotactic structure, while

[2] is at least one selected from a polypropylene resin (d) having a crystallinity degree of 20% or greater as obtained by X-ray diffraction, and an olefinic thermoplastic elastomer (e).

Furthermore, the multilayered laminate according to the invention is preferably such that the syndiotactic propylene copolymer (c) is at least partially crosslinked.

According to the invention, the above syndiotactic propylene copolymer (c) in the state prior to crosslinking, preferably has an intrinsic viscosity in the range of 0.01 to 10 dl/g as measured in decalin at 135° C., a molecular weight distribution of 4 or less as determined by gel permeation chromatography, and a glass transition temperature of 30° C. or lower.

It is also preferable that the above syndiotactic propylene copolymer (c) is obtained in the presence of at least one catalyst system: which comprises (A) a transition metal complex represented by the following Formula (I) or (II), (B) at least one compound selected from (B-1) a compound capable of reacting with the transition metal of (A) above and forming an ionic complex, (B-2) an organic aluminum oxy compound, and (B-3) an organic aluminum compound,

[Chem. 1]

$$Z \diagdown \begin{matrix} Cp^2 \\ Cp^1 \end{matrix} \diagdown \begin{matrix} X^2 \\ M \\ X^1 \end{matrix} \tag{I}$$

$$Z \diagdown \begin{matrix} Y \\ Cp^1 \end{matrix} \diagdown \begin{matrix} X^2 \\ M \\ X^1 \end{matrix} \tag{II}$$

wherein in Formulas (I) and (II), M represents Ti, Zr, Hf, Rn, Nd, Sm or Ru; $Cp^1$ and $Cp^2$ represent a cyclopentadienyl group, an indenyl group, a fluorenyl group, or a derivative group thereof, which is π-bonded to M; $X^1$ and $X^2$ represent an anionic ligand, or a neutral Lewis base ligand; Y is a ligand containing a nitrogen atom, an oxygen atom, a phosphorus atom or a sulfur atom; and Z represents a C, O, B, S, Ge, Si or Sn atom, or a group containing such atoms.

The olefinic thermoplastic elastomer laminate according to the invention is preferably such that the polypropylene resin (d) has a substantially syndiotactic structure.

The olefinic thermoplastic elastomer laminate according to the invention is preferably such that the ethylenic copolymer rubber (b) is crosslinked.

The laminate of the invention preferably has the layer (I) as a base layer, and the layer (II) as a surface layer.

According to the invention, the layer (I) is preferably an olefinic thermoplastic elastomer composition (A).

According to the invention, it is also preferable that component [2] of the olefinic thermoplastic elastomer composition (C) is a polypropylene resin (d) having a crystallinity degree of 20% or greater as obtained by X-ray diffraction, and an olefinic thermoplastic elastomer (e).

According to the invention, it is preferable that silicone oil is further contained in an amount of 0.1 to 5 parts by weight, relative to 100 parts by weight of the olefinic thermoplastic elastomer composition (C).

The olefinic thermoplastic elastomer laminate as described above has excellent moldability, heat resistance, abrasion resistance, and balance in flexibility.

Effects of the Invention

According to the invention, a molded product having excellent moldability and ability to be processed into parts as well as excellent scratch resistance can be proposed, by laminating an olefinic thermoplastic elastomer having excellent scratch resistance on a conventional olefinic thermoplastic elastomer.

BEST MODE FOR CARRYING OUT THE INVENTION

Hereinafter, the olefinic thermoplastic elastomer laminate according to the present invention will be explained in detail. The olefinic thermoplastic elastomer laminate according to the invention can be obtained by laminating the layer (I) comprising at least one selected from the olefinic thermoplastic elastomer composition (A) and the olefinic resin (B), and the layer (II) comprising the olefinic thermoplastic elastomer composition (C).

Here, the term elastomer according to the invention refers to one having a flexural modulus of 500 MPa or less as measured according to JIS K7171.

Olefinic Thermoplastic Elastomer (A)

The olefinic thermoplastic elastomer (A) contains an olefinic resin (a) and an ethylenic copolymer rubber (b).

<Olefinic Resin (a)>

The olefinic resin (a) used in the invention comprises a high molecular weight solid product obtained by polymerizing one or two or more mono-olefins by a high pressure method or a low pressure method. Such resin may be exemplified by isotactic and syndiotactic monoolefin polymer resins. Representative resins thereof are commercially available.

Suitable raw material olefin for the olefinic resin (a) may be specifically exemplified by ethylene, propylene, 1-butene, 1-pentene, 1-hexene, 1-octene, 1-decene, 2-methyl-1-propene, 3-methyl-1-pentene, 4-methyl-1-pentene, 5-methyl-1-hexene or the like. These olefins are used individually or as mixtures of two or more species.

The mode of polymerization may be random type or block type, and any polymerization mode can be suitably employed as long as products are obtained in the resin form. These olefinic resins may be used individually, or may be used in combination of two or more species.

Among these olefinic resins (a), particularly preferred are propylenic polymers, specifically, propylene homopolymer, propylene/ethylene block copolymer, propylene/ethylene or propylene/ethylene/butene random copolymer, and the like.

The polymer form may be any of isotactic and syndiotactic, but particularly an isotactic form is excellent from the viewpoint of heat resistance.

The olefinic resin (a) used in the invention preferably has an MFR (ASTM D 1238-65T, 230° C.) usually in the range of 0.01 to 100 g/10 min, and particularly in the range of 0.05 to 50 g/10 min.

The above olefinic resin (a) has a role of improving the fluidity and heat resistance of the composition. According to the invention, the olefinic resin (a) is used at a proportion of preferably 10 to 80 parts by weight, and more preferably 15 to 60 parts by weight, relative to 100 parts by weight of the total amount of the olefinic resin and the ethylenic copolymer rubber (b).

When the olefinic resin (a) is used at the above described proportion, the olefinic thermoplastic elastomer composition (A) having excellent heat resistance, flexibility and rubber elasticity, as well as excellent molding processability is obtained.

<Ethylenic Copolymer Rubber (b)>

The ethylenic copolymer rubber (b) used in the invention is an amorphous random elastomeric copolymer rubber comprising ethylene and an α-olefin having 3 to 20 carbon atoms, or an amorphous random elastomeric copolymer rubber comprising ethylene, an α-olefin having 3 to 20 carbon atoms and a non-conjugated polyene.

The molar ratio of ethylene and the α-olefin in such ethylenic copolymer (b) is usually 55/45 to 85/15, and inter alia, preferably in the range of 60/40 to 83/17.

The non-conjugated polyene may be specifically exemplified by dicyclopentadiene, 1,4-hexadiene, cyclooctadiene, methylenenorbornene, ethylidenenorbornene, vinylnorbornene or the like. Inter alia, ethylene/propylene/non-conjugated diene copolymer rubbers, and ethylene/1-butene/non-conjugated diene copolymer rubbers are preferred, and in particular, ethylene/propylene/non-conjugated diene copolymer rubbers, among them, an ethylene/propylene/ethylidenenorbornene copolymer rubber and an ethylene/propylene/vinylnorbornene copolymer rubber are particularly preferred in the aspect that thermoplastic elastomers having appropriate crosslinked structures are obtained.

The ethylenic copolymer rubber (b) used in the invention preferably has a Mooney viscosity [ML1+4 (100° C.)] of preferably in the range of 50 to 300, and more preferably in the range of 100 to 200.

The iodine value of this ethylenic copolymer rubber (b) is preferably in the range of 3 to 30, and particularly preferably in the range of 5 to 25. When the iodine value of the ethylenic copolymer rubber (b) is within the range, the thermoplastic elastomer composition (A), which is crosslinked in a well-balanced manner and has excellent moldability and rubber elasticity, is obtained.

The ethylenic copolymer rubber (b) used in the invention may be a so-called oil extended product containing softening agent. When an oil extended rubber is used, an elastomer composition having excellent flexibility is obtained. For the softening agent that can be used for oil extended rubbers, those softening agents that are usually used for rubber are used.

Specific examples include petroleum-based materials such as process oil, lubricant, paraffin, liquid paraffin, petroleum asphalt, petrolatum and the like;

coal tars such as coal tar, coal tar pitch and the like;

fatty oils such as castor oil, linseed oil, rapeseed oil, soybean oil, palm oil and the like;

waxes such as tall oil, beeswax, carnauba wax, lanolin and the like;

fatty acids or metal salts thereof, such as ricinolic acid, palmitic acid, stearic acid, barium stearate, calcium stearate and the like;

synthetic polymeric materials such as petroleum resin, coumarone-indene resin, atactic polypropylene and the like;

ester plasticizers such as dioctyl phthalate, dioctyl adipate, dioctyl sebacate and the like;

and in addition to these, microcrystalline wax, sub (factice), liquid polybutadiene, modified liquid polybutadiene, liquid Thiokol and the like.

Among these softening agents, paraffinic process oil is particular preferred, and further, paraffinic process oil of high viscosity type containing a less amount of easily volatile low molecular weight components is particularly preferred. Here, the term high viscosity type implies that the dynamic viscosity at 40° C. is in the range of 100 to 1000 centistokes.

According to the invention, the softening agent is used at a proportion of 150 parts by weight or less, preferably 2 to 100 parts by weight, and more preferably 5 to 60 parts by weight, relative to 100 parts by weight of the ethylenic copolymer rubber (b).

The ethylenic copolymer rubber (b), which may be oil extended, if necessary, as described above, is used at a proportion of 90 to 20 parts by weight, and preferably 85 to 40 parts by weight, relative to 100 parts by weight of the total amount of the olefinic resin (a) and the ethylenic copolymer rubber (b).

According to the invention, in addition to the ethylenic copolymer rubber (b), a rubber other than the ethylenic copolymer rubber (b) can be used in combination with the ethylenic copolymer rubber (b). Examples of the rubber other than the ethylenic copolymer rubber (b) include a styrene/butadiene rubber and a hydrogenated product thereof, a styrene/isoprene rubber and a hydrogenated product thereof, a polybutadiene rubber, a polyisoprene rubber, a nitrile rubber, a butyl rubber, a polyisobutylene rubber, a natural rubber, a silicone rubber and the like, within the scope of not impairing the purpose of the invention.

<Other Components>

The olefinic thermoplastic elastomer (A) according to the invention can be blended with softening agents and/or inorganic fillers, in addition to the olefinic resin (a) and the ethylenic copolymer rubber (b).

The softening agent as described above may be oil extended in the ethylenic copolymer rubber (b), or may be added later without oil extending in it. Even in the case of adding later without oil extending in the ethylenic copolymer rubber (b), the same softening agents as described above can be used.

In the case of adding the softening agent later without oil extending, the softening agent is used at a proportion of 100 parts by weight or less, preferably 3 to 80 parts by weight, and more preferably 5 to 50 parts by weight, relative to 100 parts by weight of the total amount of the olefinic resin (a) and the ethylenic copolymer rubber (b).

When the softening agent is used at the proportion described above, the obtained thermoplastic elastomer composition has excellent fluidity upon molding, and results in a molded product having good mechanical properties and heat resistance.

The inorganic filler used in the invention may be specifically exemplified by calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead, Shirasu balloon, basic magnesium sulfate whisker, calcium titanate whisker, aluminum borate whisker, or the like.

According to the invention, the inorganic filler is used at a proportion of 100 parts by weight or less, preferably 2 to 30 parts by weight, relative to 100 parts by weight of the total amount of the olefinic resin (a) and the ethylenic copolymer rubber (b). According to the invention, when the amount of the inorganic filler used exceeds 100 parts by weight, the obtained heat resistant thermoplastic elastomer composition tends to have decreased rubber elasticity and molding processability.

Furthermore, according to the invention, conventionally known heat resistant stabilizer, anti-aging agent, weather resistant stabilizer, antistatic agent, crystal nucleating agent, lubricant such as metallic soap, wax or the like can be added into the olefinic thermoplastic elastomer (A), within the scope of not impairing the purpose of the invention.

The olefinic thermoplastic elastomer composition (A) according to the invention can be obtained by mixing the above-described olefinic resin (a), the ethylenic copolymer rubber (b), and the softening agent and/or the inorganic filler and the like that are blended in as necessary, and by dynamically heat treating the mixture subsequently. Here, the term "dynamically heat treating" refers to kneading in the molten state.

Also, the olefinic crosslinked thermoplastic elastomer composition (A) can be obtained by carrying out dynamic heat treatment in the presence of a crosslinking agent.

The crosslinking agent used in this case may be exemplified by those crosslinking agents generally used for thermosetting rubber, such as organic peroxides, phenolic resins, sulfur, hydrosilicone compounds, amino resins, quinone or its derivatives, amine compounds, azo compounds, epoxy compounds, isocyanates or the like. Among these crosslinking agents, organic peroxides are particularly preferred.

The organic peroxide used in the invention may be specifically exemplified by dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide, tert-butylcumyl peroxide, or the like.

Among these, bifunctional organic peroxides such as 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene and the like are particularly preferred in the aspects of reactivity, odor property and scorch stability. Furthermore, among them, 2,5-dimethyl-2,5-di-(tert-butylperoxy)hexane is most preferred.

Such organic peroxide is used in an amount of preferably 0.02 to 3 parts by weight, more preferably 0.05 to 1 part by weight, relative to 100 parts by weight of the entire material to be treated. When the amount of the organic peroxide added is 0.02 parts by weight or more, the resulting thermoplastic elastomer composition has sufficient heat resistance, tensile properties and rubber elasticity. When this amount is 3 parts by weight or less, a thermoplastic elastomer composition having good moldability is obtained.

According to the invention, upon the crosslinking treatment by means of the organic peroxide, sulfur; peroxy crosslinking aids such as p-quinonedioxime, p,p'-dibenzoyl quinonedioxime, N-methyl-N-4-dinitrosoaniline, nitrosobenzene, diphenylguanidine, and trimethylolpropane-N,N'-m-phenylene dimaleimide; divinylbenzene; triallylcyanurate; multifunctional methacrylate monomers such as ethylene glycol dimethacrylate, diethylene glycol dimethacrylate, polyethylene glycol dimethacrylate, trimethylolpropane trimethacrylate, and allyl methacrylate; or multifunctional vinyl monomers such as vinyl butyrate and vinyl stearate can be blended in.

By using the compounds like those as described above, a homogeneous and mild crosslinking reaction can be expected. In particular, according to the invention, divinylbenzene is most preferred. Divinylbenzene is easily handlable, has good compatibility with the crystalline polyolefin resin (a) and the ethylenic copolymer rubber (b), which are the main components of the material to be crosslinked, and has an effect of solubilizing organic peroxides, thus acting as a dispersant for organic peroxides. Thus, a thermoplastic elastomer composition in which the crosslinking effect achieved by heat treatment is uniform, and which is well balanced between fluidity and physical properties, is obtained.

The above-described compounds such as crosslinking aids or multifunctional vinyl monomers, are used in an amount of usually 5 parts by weight or less, preferably 0.2 to 3 parts by weight, relative to 100 parts by weight of the entire material to be treated.

Also, in order to promote decomposition of the organic peroxide, a tertiary amine such as triethylamine, tributylamine, 2,4,6-tri(dimethylamino)phenol or the like, or a decomposition promoting agent such as naphthenate of aluminum, cobalt, vanadium, copper, calcium, zirconium, manganese, magnesium, lead, mercury or the like may be used.

The dynamic heat treatment according to the invention is preferably carried out in a non-open type apparatus, and is preferably carried out in an atmosphere of inert gas such as nitrogen, carbon dioxide or the like. The temperature for the heat treatment is in the range of the melting point from the crystalline polyolefin resin (a) to 300° C., usually 140° C. to 290° C., and preferably 170° C. to 270° C. The kneading time is usually 1 to 20 minutes, and preferably 1 to 10 minutes. The applied shear force is, in terms of the shear rate, usually in the range of 10 to 10,000 sec$^{-1}$, and preferably in the range of 100 to 5,000 sec$^{-1}$.

For the kneading apparatus, a mixing roll, an intensive mixer (for example, Banbury mixer, kneader), a single-screw or twin-screw extruder or the like may be used, but a non-open type apparatus is preferred, with a twin-screw extruder among them being particularly preferred.

The olefinic thermoplastic elastomer (A) of the invention is preferably statically heat treated in hot air, after the dynamic heat treatment as described above. The heat treatment is preferably carried out at 80 to 130° C. for about 0.5 to 10 hours. Through this heat treatment, residues of the crosslinking agent and the like can be removed; thus, bad odor of the resulting product can be reduced, or a product having good fogging property can be obtained.

Olefinic Resin (B)

The olefinic resin (B) used in the invention may be exemplified by those listed as the olefinic resin (a), which is the raw material for the olefinic thermoplastic elastomer. Also, within the scope of not impairing the properties, the above-mentioned inorganic fillers, various additives and stabilizers may be added.

Olefinic Thermoplastic Elastomer (C)

The olefinic thermoplastic elastomer (C) according to the invention contains

[1] a syndiotactic polypropylene copolymer (c), and

[2] at least one selected from a polypropylene resin (d) and an olefinic thermoplastic elastomer (e).

<Syndiotactic Propylene Copolymer (c)>

The syndiotactic propylene copolymer used in the invention comprises (c-1) a repeating unit derived from propylene, (c-2) a repeating unit derived from at least one olefin selected from olefins having 2 to 20 carbon atoms excepting propylene, and if necessary, (c-3) a repeating unit derived from polyene.

The above-described unit (c-2) is a repeating unit derived from at least one olefin selected from olefins having 2 to 20 carbon atoms excepting propylene, for example, linear or branched α-olefins such as ethylene, 1-butene, 1-pentene, 1-hexene, 4-methyl-1-pentene, 3-methyl-1-pentene, 1-octene, 3-methyl-1-butene, 1-decene, 1-dodecene, 1-tetradodecene, 1-hexadecene, 1-octadecene, 1-eicocene and the like; cyclic olefins such as cyclopentene, cycloheptene, norbornene, 5-ethyl-2-norbornene, tetracyclododecene, 2-ethyl-1,4,5,8-dimethano-1,2,3,4,4a,5,8,8a-octahydronaphthalene and the like; and the like.

The unit (c-2) of the invention is preferably a repeating unit derived from at least one olefin selected from ethylene, 1-butene, 4-methyl-1-pentene, 1-hexene, 1-octene and 1-decene, and particularly preferably a repeating unit derived from ethylene or butene. The unit (c-2) may contain two or more olefins.

The above-described unit (c-3) is a repeating unit derived from at least one polyene selected from the following conjugated polyenes and non-conjugated polyenes.

The conjugated polyene may be specifically exemplified by conjugated dienes such as 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene, 2-phenyl-1,3-butadiene or the like; conjugated trienes such as 1,3,5-hexatriene or the like. Among them, butadiene, isoprene, pentadiene, hexadiene, and octadiene are preferred, with butadiene and isoprene being particularly preferred in view of their excellent copolymerizability.

The non-conjugated polyene may be specifically exemplified by non-conjugated dienes such as dicyclopentadiene, 1,4-hexadiene, cyclooctadiene, methylenenorbornene, ethylidenenorbornene, 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 9-methyl-1,8-undecadiene or the like; non-conjugated trienes such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene, 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene, 4-ethylidene-1,7-undecadiene or the like.

These non-conjugated polyenes are preferred in the aspect of their excellent abrasion resistance in the crosslinked state.

Among these, 5-ethylidene-2-norbornene, 5-vinyl-2-norbornene, dicyclopentadiene (DCPD), 4,8-dimethyl-1,4,8-decatriene (DMDT), and 4-ethylidene-8-methyl-1,7-nonadiene (EMND) are preferred. The unit (c-3) may contain two or more polyenes.

The syndiotactic propylene copolymer contains the unit (c-1) usually in an amount of 99 to 50% by mole, preferably in an amount of 98 to 60% by mole, and particularly preferably in an amount of 90 to 65% by mole and the unit (c-2) usually in an amount of 1 to 50% by mole, preferably in an amount of 2 to 40% by mole, and even more preferably in an amount of 10 to 35% by mole, when the total amount of unit (c-1) and unit (c-2) is 100% by mole.

The syndiotactic propylene copolymer containing the unit (c-1) and unit (c-2) in these amounts has excellent scratch resistance. Such syndiotactic propylene copolymer also has good compatibility with thermoplastic resins, and the resulting thermoplastic resin composition tends to exhibit sufficient flexibility, heat sealability and impact resistance.

The syndiotactic propylene copolymer may contain, if desired, the above-described unit (c-3) preferably in an amount of 0.01 to 30 parts by mole, preferably 0.1 to 30 parts by mole, and more preferably 0.3 to 20 parts by mole, relative to 100 parts by mole of the total amount of the unit (c-1) and unit (c-2).

When the syndiotactic propylene copolymer is to be crosslinked, crosslinking efficiency is enhanced by the existence of the unit (c-3), and thus contributes to an improvement in the heat resistance.

The syndiotactic polypropylene copolymer (c) has a crystallinity degree of less than 20% as obtained by X-ray diffraction.

The syndiotactic propylene copolymer used in the invention has a substantially syndiotactic structure, and the syndiotacticity parameter is 0.6 or greater, preferably 0.7 or greater. When the syndiotacticity is within this range, the syndiotactic propylene copolymer has high crystallization rate and excellent processability. In addition, a substantially syndiotactic structure as used herein means that the syndiotacticity parameter is 0.6 or greater.

Here, the syndiotacticity parameter will be described.

This syndiotacticity parameter (hereinafter, may be referred to as "SP value") of the syndiotactic propylene copolymer is determined from the $^{13}$C-NMR spectrum of the syndiotactic propylene copolymer and the following formula (1), as a ratio of the intensity (area) of the side chain methyl group in the second unit of a triad of propylene units with head-to-tail bonding.

SP value=signal area of the $3^{rd}$ region (19.5 to 20.3 ppm)/{signal area of the $1^{st}$ region (21.0 to 21.9 ppm)+signal area of the $2^{nd}$ region (20.3 to 21.0 ppm)+signal area of the $3^{rd}$ region (19.5 to 20.3 ppm)} (1)

The $1^{st}$ region is represented by PPP (mm), the $2^{nd}$ region by PPP (mr), and the $3^{rd}$ region by PPP (rr). These respectively indicate triads of propylene units with head-to-tail bonding, which have the following structures.

[Cem. 2]

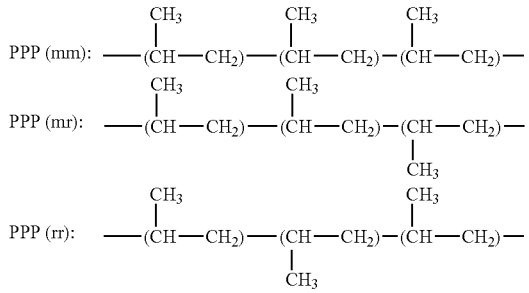

Furthermore, in the region of methyl carbon (19 to 23 ppm), apart from the side chain methyl groups of propylene unit in the above-described triads of propylene units with head-to-tail bonding, peaks for the side chain methyl group of propylene unit in other sequences as described below are observed. In order to determine the SP value, correction is made for the peak area for a methyl group that is not based on such triads of propylene units as follows. In addition, P represents a repeating unit derived from propylene, and E represents a repeating unit derived from ethylene.

(1) In the $2^{nd}$ region, a peak originating from the side chain methyl group in the second unit (propylene unit) of a PPE triad with head-to-tail bonding between propylene units is observed.

The area of this peak for methyl group can be determined from the peak area of a methyne group (resonance in the vicinity of 30.6 ppm) in the second unit (propylene unit) of a PPE triad.

(2) In the $3^{rd}$ region, a peak originating from the side chain methyl group in the second unit (propylene unit) of an EPE triad is observed.

The area of this peak for methyl group can be determined from the peak area of a methyne group (resonance in the vicinity of 32.9 ppm) in the second unit (propylene unit) of an EPE triad.

(3) In the $2^{nd}$ region and the $3^{rd}$ region, peaks originating from the methyl groups C to E' in the regio-irregular units as represented by the following partial structures (i), (ii) and (iii), which are contained in propylene/ethylene random copolymers in small amounts, are observed.

In the $2^{nd}$ region, a peak for methyl group C, a peak for methyl group D, and a peak for methyl group D' are observed, while in the $3^{rd}$ region, a peak for methyl group E and a peak for methyl group E' are observed.

Among the methyl groups in the regio-irregular units (i) through (iii), a peak for methyl group A and a peak for methyl group B are observed at 17.3 ppm and 17.0 ppm, respectively, and thus are not observed in the $1^{st}$ to $3^{rd}$ regions.

[Chem. 3]

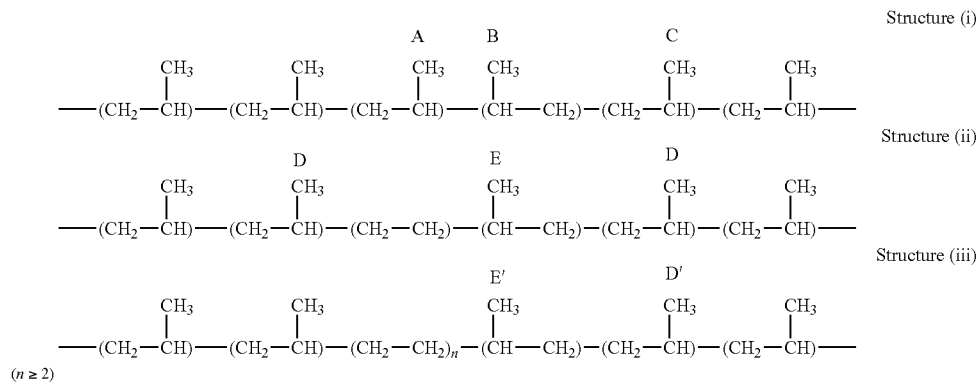

The peak area for methyl group C can be determined from the peak area of the adjacent methyne group (resonance in the vicinity of 31.3 ppm).

The peak area for methyl group D can be determined from a half of the sum of peak areas of the peaks based on the αβ methylene carbon in structure (ii) (in the vicinity of 34.3 ppm, and in the vicinity of 34.5 ppm).

The peak area for methyl group D' can be determined from the area of the peak based on the methyne group adjacent to methyl group E' in structure (iii) (in the vicinity of 33.3 ppm).

The peak area for methyl group E can be determined from the peak area of the adjacent methyne carbon (in the vicinity of 33.7 ppm).

The peak area for methyl group E' can be determined from the peak area of the adjacent methyne carbon (in the vicinity of 33.3 ppm).

Therefore, the peak area for the side chain methyl group in the second propylene unit of a triad of propylene units with head-to-tail bonding can be determined by subtracting these peak areas from the total area of peaks in the $2^{nd}$ region and the $3^{rd}$ region.

Each carbon peak in the spectrum can be assigned with reference to the literature [Polymer, 30, 1350 (1989)].

In addition, the syndiotactic structure is specifically measured as follows. That is, 0.35 g of a sample is dissolved by heating in 2.0 ml of hexachlorobutadiene. This solution is filtered through a glass filter (G2), 0.5 ml of deuterated benzene is added to the filtrate, and the mixture is introduced in an NMR tube with an internal diameter of 10 mm. Then, $^{13}$C-NMR measurement is carried out at 120° C. using a GX-500 type NMR spectrometer manufactured by JEOL, Ltd. The number of integration is 10,000 or greater.

According to a preferred embodiment of the invention, the unit (c-2) is an ethylene unit, while the content of the ethylene unit is in the range of 1 to 40% by mole, relative to 100% by mole of the total amount of the unit (c-1) and unit (c-2), and the SP value is 0.6 or greater, preferably 0.7 or greater.

Such syndiotactic propylene copolymer preferably has an intrinsic viscosity [η] of usually in the range of 0.01 to 10 dl/g, preferably in the range of 0.05 to 10 dl/g, as measured in decalin at 135° C. When the intrinsic viscosity [η] of the syndiotactic propylene copolymer is within the above-described range, the crosslinked product of the syndiotactic propylene copolymer has excellent properties such as weather resistance, ozone resistance, thermal aging resistance, low temperature properties, dynamic fatigue resistance, and the like.

The syndiotactic propylene copolymer preferably has an iodine value of usually in the range of 0 to 50, preferably in the range of 1 to 40, and more preferably in the range of 3 to 30.

Furthermore, the syndiotactic propylene copolymer has a single glass transition temperature, and the glass transition temperature (Tg) measured by a differential scanning calorimeter (DSC) is preferably in the range of usually 30° C. or lower, and preferably 20° C. or lower. The crosslinked product of syndiotactic propylene copolymer having the glass transition temperature (Tg) of the syndiotactic propylene copolymer in the above-described range, has excellent damping property, cold resistance and low temperature properties.

For the syndiotactic propylene copolymer, it is preferable that the temperature at the maximum peak position (Tm) in the endotherm curve of DSC is less than 110° C., and preferably that Tm does not exist. Tm is determined from an endotherm curve obtained as the sample is placed in an aluminum pan, heated to 200° C. at a rate of 100° C./min, maintained at 200° C. for 5 minutes, then cooled to −150° C. at a rate of 10° C./min, and subsequently heated at a rate of 10° C./min.

The syndiotactic propylene copolymer preferably has a molecular weight distribution (Mw/Mn, as calculated on the basis of polystyrene, Mw: a weight average molecular weight, Mn: a number average molecular weight) of 4.0 or less as measured by a gel permeation chromatography (GPC).

Method for Producing Syndiotactic Propylene Copolymer

When such syndiotactic propylene copolymer is to be produced, a metallocene catalyst as described below is preferably used as a catalyst.

Upon production of the syndiotactic propylene copolymer, the catalyst systems described in JP-A No. 2-41303, JP-A No. 41305, JP-A No. 2-274703, JP-A No. 2-274704, JP-A No. 3-179005, JP-A No. 3-179006, JP-A No. 4-69394, JP-A No. 5-17589 or JP-A No. 8-120127 may be used instead of the above-mentioned catalyst system.

Specifically, the catalyst system described in J. A. Ewen, et al., [J. Am. Chem. Soc., 1988, 110, 6255-6256] may be also used. Furthermore, even with a compound having a structure different from that of the compound described in the above literature, a catalyst system which yields a polymer having a relatively high tacticity such that the syndiotactic triad fraction [A. Zambelli, et al., Macromolecules, Vol. 6, 687 (1973); ibid, Vol. 8, 925 (1975)] of the resulting polymer produced by homopolymerization of propylene is, for example, about 0.5 or greater, can be used. Such catalyst system may be exemplified by a catalyst system comprising a bridged transition metal compound having ligands that are asymmetric to each other, and a co-catalyst such as organic aluminum or the like.

The bridged transition metal compound having ligands that are asymmetric to each other, which constitutes such catalyst system, may be exemplified by diphenylmethylene(cyclopentadienyl)(fluorenyl)hafnium dichloride, diphenylmethylene(cyclopentadienyl)(fluorenyl)zirconium dichloride, isopropyl(cyclopentadienyl-1-fluorenyl)hafnium dichloride, isopropyl (cyclopentadienyl-1-fluorenyl)zirconium dichloride, (t-butylamido)dimethyl(fluorenyl)silanetitanium dimethyl, diphenylmethylene(cyclopentadienyl)(fluorenyl)zirconium dichloride or the like, described in the above-mentioned literature.

The syndiotactic propylene copolymer used in the invention can be prepared by, for example, polymerizing propylene, at least one olefin selected from olefins having 2 to 20 carbon atoms excepting propylene, and at least one polyene selected from conjugated polyenes and non-conjugated polyenes, in the presence of the catalyst as described above, so that the final product has the properties as described above.

Polymerization can be carried out by any of a liquid phase polymerization method such as suspension polymerization, solution polymerization or the like, and a gas phase polymerization method.

In a liquid phase polymerization method, an inert hydrocarbon solvent, for example, an aliphatic hydrocarbon such as propane, butane, pentane, hexane, heptane, octane, decane, dodecane, kerosene or the like; an alicyclic hydrocarbon such as cyclopentane, cyclohexane, methylcyclopentane or the like; an aromatic hydrocarbon such as benzene, toluene, xylene or the like; a halogenated hydrocarbon such as ethylene chloride, chlorobenzene, dichloromethane or the like; or a mixture of these, can be used as the polymerization medium, and propylene can also be used as the solvent.

When suspension polymerization is to be carried out, polymerization is preferably carried out at a temperature of usually −50 to 100° C., preferably 0 to 90° C. When solution polymerization is to be carried out, polymerization is preferably carried out at a temperature of usually 0 to 250° C., preferably 20 to 200° C. When a gas phase polymerization method is to be carried out, polymerization is preferably carried out at a temperature of usually 0 to 120° C., preferably 20 to 100° C. Polymerization is carried out at a pressure of usually ambient pressure to 10 MPa, preferably ambient pressure to 5 MPa.

Polymerization can be carried out in any of batch mode, semi-continuous mode, and continuous mode. Further, it is also possible to carry out the polymerization in two or more stages under different reaction conditions.

The molecular weight of the obtained syndiotactic propylene copolymer can be adjusted by allowing hydrogen to be present in the polymerization system, or by changing the polymerization temperature or polymerization pressure.

More specifically, the syndiotactic propylene copolymer used in the invention can be obtained by, for example, copolymerizing propylene, at least one olefin selected from olefins having 2 to 20 carbon atoms excepting propylene, and at least one polyene selected from conjugated polyenes and non-conjugated polyenes, in the presence of at least one catalyst system comprising (A) a transition metal complex represented by the following Formula (I) or (II), and (B) at least one compound selected from (B-1) a compound capable of reacting with the transition metal M of (A) above and forming an ionic complex (hereinafter, may be referred to as "ionizing ionic compound"), (B-2) an organic aluminum oxy compound, and (B-3) an organic aluminum compound.

(A) Transition Metal Complex

The transition metal complex forming a metallocene catalyst is represented by the following Formula (I) or (II).

[Chem. 4]

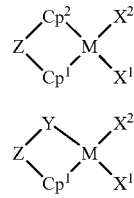

In the Formula (I), M represents Ti, Zr, Hf, Rn, Nd, Sm or Ru, and preferably Ti, Zr or Hf.

$Cp^1$ and $Cp^2$, which may be identical with or different from each other, is a cyclopentadienyl group, an indenyl group, a fluorenyl group, or a derivative group thereof, which is π-bonded to M. To described in more detail, $Cp^1$ and $Cp^2$ are each a ligand coordinating the transition metal M, and are each a ligand having a cyclopentadienyl skeleton such as a cyclopentadienyl group, an indenyl group, a 4,5,6,7-tetrahydroindenyl group, a fluorenyl group or the like. This ligand having a cyclopentadienyl skeleton may have a substituent such as an alkyl group, a cycloalkyl group, a trialkylsilyl group, a halogen atom or the like.

$X^1$ and $X^2$, which may be identical with or different from each other, are each an anionic ligand or a neutral Lewis base ligand. Specific examples thereof include a hydrocarbon group having 1 to 12 carbon atoms, an alkoxy group, an aryloxy group, a sulfonic acid-containing group ($-SO_3R^a$, provided that $R^a$ is an alkyl group, an alkyl group substituted with halogen atom, an aryl group, an aryl group substituted with halogen atom, or an aryl group substituted with an alkyl group), a halogen atom, a hydrogen atom, and the like.

Y is a ligand containing a nitrogen atom, a phosphorus atom, an oxygen atom or a sulfur atom, and Z and Y may form a fused ring.

Z is a C, O, B, S, Ge, Si or Sn atom, or a group containing such atoms. These atoms may have substituents such as an alkyl group, an alkoxy group or the like, and the substituents of Z may be bonded to each other to form a ring. The linking group Z may be exemplified by a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, $-CO-$, $-SO-$, $-SO_2-$, $-BR^b-$ (provided that $R^b$ is a hydrogen atom, a halogen atom, a hydrocarbon group having 1 to 20 carbon atoms, or a halogenated hydrocarbon group having 1 to 20 carbon atoms) or the like, and preferably a group containing one O, Si or C.

Examples of the transition metal complex represented by the Formula (I) or (II) will be presented below.

Diphenylmethylene(cyclopentadienyl)(fluorenyl)hafnium dichloride, diphenylmethylene(cyclopentadienyl)fluorenylzirconium dichloride, isopropyl(cyclopentadienyl-1-fluorenyl)hafnium dichloride, isopropyl(cyclopentadienyl-1-fluorenyl)zirconium dichloride, (t-butylamido)dimethyl (fluorenyl)silanetitanium dimethyl, diphenylmethylene (cyclopentadienyl)fluorenylzirconium dichloride, etc.

With respect to the compounds as described above, transition metal complexes having titanium metal or hafnium metal instead of zirconium metal may be exemplified, and transition metal complexes having zirconium metal or titanium metal instead of hafnium metal may be also exemplified.

The transition metal complex as described above can be used individually or in combination of two or more species.

Particulate Support

The above-described transition metal complex (A) can be used as being supported on a particulate support. For such particulate support, inorganic supports such as $SiO_2$, $Al_2O_3$, $B_2O_3$, MgO, $ZrO_2$, CaO, $TiO_2$, ZnO, $SnO_2$, BaO, ThO and the like; and organic supports such as poly-α-olefin, polypropylene, poly-1-butene, poly-4-methyl-1-pentene, a styrene-divinylbenzene copolymer and the like can be used. These particulate supports can be used individually or in combination of two or more species.

(B-1) Ionizing Ionic Compound

An ionizing ionic compound is a compound capable of reacting with the transition metal M of the transition metal complex (A) and forming an ionic complex, and such ionizing ionic compound may be exemplified by Lewis acids, ionic compounds, borane compounds and carborane compounds.

The Lewis acid may be exemplified by a compound represented by $BR_3$ (wherein R is a phenyl group which may be substituted with a fluorine atom, a methyl group, a trifluoromethyl group or the like, or a fluorine atom), for example, trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, tris(3,5-dimethylphenyl)boron, or the like.

The ionic compound may be exemplified by trialkyl-substituted ammonium salts, N,N-dialkylanilinium salts, dialkylammonium salts, triarylphosphonium salts, or the like. Specific examples of the trialkyl-substituted ammonium salt include triethylammonium tetra(phenyl)boron, tripropylammonium tetra(phenyl)boron, tri(n-butyl)ammonium tetra(phenyl)boron and the like; and examples of the dialkylammonium salt include di(1-propyl)ammonium tetra(pentafluorophenyl)boron, dicyclohexylammonium tetra(phenyl)boron, and the like. The ionic compound may be further exemplified by triphenylcarbenium tetrakis(pentafluorophenyl)borate, N,N-dimethylanilinium tetrakis(pentafluorophenyl)borate, ferrocenium tetra(pentafluorophenyl)borate, or the like.

The borane compound may be exemplified by salts of metallic borane anions such as decaborane (14), bis[tri(n-butyl)ammonium]nonaborate, bis[tri(n-butyl)ammonium]decaborate, bis[tri(n-butyl)ammonium]bis(dodecahydride dodecaborate)nickelate (III), and the like.

The carborane compound may be exemplified by salts of metallic carborane anions such as 4-carbanonaborane (14), 1,3-dicarbanonaborane (13), bis[tri(n-butyl)ammonium]bis(undecahydride-7-carbaundecaborate)nickelate (IV), and the like.

The ionizing ionic compounds as described above can be used individually or in combination of two or more species.

(B-2) Organic Aluminum Oxy Compound

The organic aluminum oxy compound (B-2) may be a conventionally known aluminoxane, or may be a benzene-insoluble organic aluminum oxy compound as exemplified in JP-A No. 2-78687.

A conventionally known aluminoxane (alumoxane) is specifically represented by the following formula:

[Chem. 5]

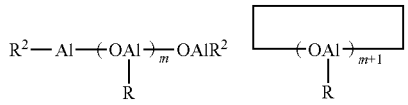

wherein R is a hydrocarbon group such as a methyl group, an ethyl group, a propyl group, a butyl group or the like, preferably a methyl group or an ethyl group, and particularly preferably a methyl group m is an integer of 2 or greater, and preferably an integer from 5 to 40.

Here, the aluminoxane may be formed from a mixed alkyloxyaluminum unit comprising an alkyloxyaluminum unit represented by the formula: $(OAl(R^1))$, and an alkyoxyaluminum unit represented by the formula: $(OAl(R^2))$ (wherein each $R^1$ and $R^2$ is a hydrocarbon group which is identical with R; and each $R^1$ and $R^2$ represents a different group).

Further, the organic aluminum oxy compound may contain a small amount of organic compound components of metals other than aluminum.

The above organic aluminum oxy compound can be used individually as one species, or in combination of two or more species.

The above-described organic aluminum oxy compound or ionizing ionic compound can also be used as being supported on the above-described particulate support.

Upon formation of the catalyst, the following organic aluminum compound (B-3) may be used together with the ionizing ionic compound (B-1) or an organic aluminum oxy compound (B-2).

(B-3) Organic Aluminum Compound

For the organic aluminum compound, a compound having at least one Al-carbon bond in the molecule can be used. Such compound may be exemplified by an organic aluminum compound represented by the following formula:

wherein $R^1$ and $R^2$, which may be identical with or different from each other, represent a hydrocarbon group having usually 1 to 15, preferably 1 to 4, carbon atoms; X represents a halogen atom; m is a number satisfying $0<m\leq3$; n is a number satisfying $0\leq n<3$; p is a number satisfying $0\leq p<3$; q is a number satisfying $0\leq q<3$; and $m+n+p+q=3$.

According to the invention, for the catalyst for production of the syndiotactic propylene copolymer, metallocene catalysts as described above are preferably used, and in some cases, conventionally known catalysts, (1) a titanium-based catalyst comprising a solid phase titanium catalyst component and an organic aluminum compound, or (2) a vanadium-based catalyst comprising a soluble vanadium compound and an organic aluminum compound, can also be used, in addition to the metallocene catalysts.

According to the invention, propylene, an olefin other than propylene, and a polyene are copolymerized usually in the liquid phase, in the presence of the above-described metallocene catalyst. Here, an inert hydrocarbon solvent as described above is generally used, but propylene may be also used as the solvent. The copolymerization can be carried out in any of batch mode or continuous mode.

When copolymerization is carried out in the batch mode using a metallocene catalyst, the concentration of the transition metal complex (A) in the polymerization system is usually 0.00005 to 1 mmol, preferably 0.0001 to 0.5 mmol, per 1 liter of polymerization volume.

The ionizing ionic compound (B-1) is used in an amount such that the molar ratio (B-1/A) of the ionizing ionic compound to the transition metal complex (A) is usually 0.5 to 20, and preferably 1 to 10.

The organic aluminum oxy compound (B-2) is used in an amount such that the molar ratio (Al/M) of aluminum atom (Al) to the transition metal atom (M) of the transition metal complex (A) is usually 1 to 10000, and preferably 10 to 5000.

When the organic aluminum compound is used, this compound is used in an amount of usually about 0 to 5 mmol, preferably about 0 to 2 mmol, per 1 liter of polymerization volume.

The copolymerization reaction is usually carried out under the conditions of a temperature in the range of −20 to 150° C., preferably 0 to 120° C., and more preferably 0 to 100° C., and at a pressure in the range of greater than 0 to 8 MPa, and preferably greater than 0 to 5 MPa.

The reaction time (the average residence time in the case where the copolymerization is carried out in the continuous mode) may vary depending on the conditions such as catalyst concentration, polymerization temperature and the like, but is usually 5 minutes to 3 hours, and preferably 10 minutes to 1.5 hours.

When propylene, an olefin and a polyene are copolymerized as described above, a syndiotactic propylene copolymer is obtained usually as a polymerization liquid containing the copolymer. A syndiotactic propylene copolymer is obtained by treating this polymerization liquid by an ordinary method.

<Polypropylene Resin (d)>

The polypropylene resin (d) used in the invention has a crystallinity degree of 20% or greater as obtained by X-ray diffraction, and any of commercially available homo type, block type and random type can be used, in addition, any of isotactic form and syndiotactic form can be used. Among them, a syndiotactic polypropylene resin is particularly preferred. Here, the above-described syndiotacticity parameter is preferably 0.6 or greater, and more preferably 0.7 or greater. More preferably, the melt flow rate (230° C., under a load of 2.16 kg) of the polypropylene resin (d) is 0.01 to 100 g/10 min.

<Olefinic Thermoplastic Elastomer (e)>

The olefinic thermoplastic elastomer (e) used in the invention may be exemplified by the same elastomers listed for the terms of the olefinic thermoplastic elastomer composition (A). The olefinic thermoplastic elastomer (e) may be identical with the olefinic thermoplastic elastomer (A), or not identical.

The syndiotactic propylene copolymer (c) in the olefinic thermoplastic elastomer composition (C) according to the invention is used at a proportion of preferably 10 to 90 parts by weight, and more preferably 20 to 70 parts by weight, relative to 100 parts by weight of the total amount of the syndiotactic propylene copolymer (c), polypropylene resin (d) and an olefinic thermoplastic elastomer (e).

Given the total amount of the polypropylene resin (d) and the olefinic thermoplastic elastomer (e) is 100 parts by weight, the (d)/(e) is 0 to 100/100 to 0 (parts by weight), and preferably 5 to 50/95 to 50 (parts by weight).

<Other Components>

The olefinic thermoplastic elastomer (C) according to the invention can be blended with the same softening agent and/or inorganic filler as those listed for the olefinic thermoplastic elastomer (A), in addition to [1] the syndiotactic propylene copolymer (c) and [2] polypropylene resin (d) and/or the olefinic thermoplastic elastomer (e).

When silicone oil is added, the scratch resistance is further enhanced. The silicone oil used for the invention may be specifically exemplified by dimethylsilicone oil, phenylmethylsilicone oil, fluorosilicone oil, tetramethyltetraphenyltrisiloxane, modified silicone oil, or the like. Among these, dimethylsilicone oil and phenylmethylsilicone oil are preferably used.

The kinematic viscosity [JIS K 2283, 25° C.] of this silicone oil is in the range of 10 to 30,000 cSt, preferably 50 to 10,000 cSt, and more preferably 100 to 5,000 cSt. When silicone oil is to be used for the invention, the amount of addition thereof is 0.1 to 5 parts by weight, and preferably 0.5 to 3 parts by weight, relative to 100 parts by weight of the olefinic thermoplastic composition (C).

In addition, according to the invention, conventionally known heat resistant stabilizer, anti-aging agent, weather resistant stabilizer, antistatic agent, lubricant such as metallic soap, wax or the like can be added to the olefinic thermoplastic elastomer (C), within the scope of not impairing the purpose of the invention.

The olefinic thermoplastic elastomer composition (C) according to the invention can be obtained by mixing the above-described syndiotactic propylene copolymer (c), the polypropylene resin (d) and the olefinic thermoplastic elastomer (e), and the softening agent and/or inorganic filler or the like, which are blended in as necessary, and then dynamically heat treating the mixture. Here, the term "dynamically heat treating" refers to kneading in a molten state.

Furthermore, the crosslinked olefinic thermoplastic elastomer (C) can be also obtained by carrying the dynamic heat treatment in the presence of the crosslinking agent. Crosslinking allows an improvement in the heat resistance.

For the crosslinking of the olefinic thermoplastic elastomer (C), the crosslinking agent, crosslinking aid, and decomposition promoting agent listed in terms of the olefinic thermoplastic elastomer (A) can be used.

Also, the dynamic heat treatment of the olefinic thermoplastic elastomer (C) can be carried out by the same method as that used for the olefinic thermoplastic elastomer (A).

When a method of irradiating an electron beam is employed as a crosslinking method, a crosslinked product can be obtained by obtaining a homogeneous composition by the above-described dynamic heat treatment, then molding the composition into an intended shape by an extruder, an injection molding machine, a blow molding machine, a calendar roll, a press or the like, and irradiating thereto an electron beam. The irradiation of electron beam is preferably carried out using an electron beam having an energy of 0.1 to 10 MeV (mega electron-volts), preferably 0.3 to 2 MeV, in an absorbed dose of 0.5 to 35 Mrad (megarad), preferably 0.5 to 10 Mrad.

The olefinic thermoplastic elastomer composition (C) according to the invention has excellent scratch resistance, abrasion resistance and balance in flexibility.

Laminate

The multilayered laminate of the invention is a multilayered laminate in which a layer (I) comprising at least one selected from the olefinic thermoplastic elastomer composition (A) and the olefinic resin (B), and a layer (II) comprising the olefinic thermoplastic elastomer composition (C) are laminated. It is more preferable that the layer (I) is a base layer, while the layer (II) is a surface layer.

It is preferable that layer (I) is the olefinic thermoplastic elastomer composition (A), since the laminate as a whole has flexibility and rubber elasticity. It is also preferable that component [2] of the olefinic thermoplastic elastomer composition (C) of the layer (II) comprises both the polypropylene resin (d) having a crystallinity degree of 20% or greater as obtained by X-ray diffraction, and the olefinic thermoplastic elastomer (e), since the laminate is excellently balanced in the scratch resistance, toughness, rubber elasticity, designability (low gloss property), and the like. The surface layer may be provided with embossing finish when needed.

The multilayered laminate of the invention may further have layers other than layer (I) and layer (II) (for example, an expanded layer, a gas barrier resin layer, etc.).

The layer (I) and layer (II) can be subjected to adhesive lamination by heat-sealing, without using an adhesive.

The shape of the multilayered laminate according to the invention is not particularly limited, and may be exemplified by sheet shape, tube shape, cylindrical shape, rectangular column shape, irregular shape, or the like.

The thicknesses of the layer (I) and layer (II) are not particularly limited, but the thickness of layer (I) is preferably 0.1 to 50 mm, while the thickness of layer (II) is preferably 5 μm to 10 mm.

The method for producing the layered product may be exemplified by i) a sequential method in which on one preliminarily molded layer, the other layer is laminated by calendar molding or T-die extrusion, ii) a method of extruding the layer (I) and the layer (II) by extruding the multilayer simultaneously, iii) a method of laminating layer (I) and layer (II) by sequential injection molding or simultaneous injection molding (more specifically, a method of sequential injection molding, by which layers are laminated in the mold by injecting one layer and then injecting the other layer; or, a method of simultaneous molding, by which the laminated parts are molded by injecting a base layer and a surface layer simultaneously via so-called sandwich molding), iv) a method of laminating layer (I) and layer (II) by multilayered extrusion blow molding, or the like.

INDUSTRIAL APPLICABILITY

Suitable application examples of the multilayered laminate of the invention will be described below.

Exterior furnishings of automobile (various molding parts such as side molding, bumper molding, roof molding, window molding, belt molding, door molding and the like, sealing parts such as glass run channel, weather strip and the like), interior furnishings of automobile (steering wheel, pillar, instrument panel, door trim, ceiling, wheelhouse cover, lid of console box, various levers, grips; when used for automobile skin coverage, an olefinic or urethane-based expanded material can be further laminated, and the surface may be embossed), members for civil construction, housing for domestic electric appliances, sports goods, daily goods, and miscellaneous goods.

EXAMPLES

Polymerization Example 1

Synthesis of Syndiotactic Propylene/ethylene Copolymer

To a 1.5-liter autoclave that had been dried under a reduced pressure and nitrogen-purged, 750 ml of heptane was added at ambient temperature, and subsequently 0.3 ml of a 1.0 mmol/ml toluene solution of triisobutylaluminum was added such that the amount in terms of aluminum atom was 0.3 mmol. 50.7 liters (25° C., 1 atmosphere) of propylene was introduced under stirring, and the temperature was elevated to reach 30° C. Then, the system was pressurized with ethylene to 5.5 kg/cm$^2$G, and 3.75 ml of a heptane solution (0.0002 mM/ml) of diphenylmethylene(cyclopentadienyl)(fluorenyl) zirconium dichloride that had been synthesized by a known method, and 2.0 ml of a toluene solution (0.002 mM/ml) of triphenylcarbenium tetra(pentafluorophenyl)borate were added to initiate copolymerization of propylene and ethylene. The catalyst concentrations at this time were 0.001 mmol/liter of diphenylmethylene(cyclopentadienyl)(fluorenyl)zirconium dichloride and 0.004 mmol/liter of triphenylcarbenium tetra(pentafluorophenyl)borate with respect to the entire system.

During the polymerization, ethylene was continuously supplied to maintain the internal pressure at 5.5 kg/cm$^2$G. After 30 minutes of the initiation of polymerization, methyl alcohol was added to stop the polymerization reaction. After depressurizing, the polymer solution was removed, and this polymer solution was washed using an "aqueous solution made by adding 5 ml of concentrated hydrochloric acid to 1 liter of water" at a ratio of 1:1 with respect to the polymer solution, in order to transfer the catalyst residues to the aqueous phase. This catalyst mixed solution was left to stand still, and then the aqueous phase was separated and removed, further washed two times with distilled water, and the polymerization liquid phase was subjected to oil-water separation. Subsequently, the oil-water separated polymerization liquid phase was contacted with acetone of 3-folds volume under vigorous stirring to precipitate the polymer, and then was washed sufficiently with acetone, and the solid product (copolymer) was collected by filtration. The solid product was dried under a nitrogen stream at 130° C. and 350 mmHg for 12 hours.

The intrinsic viscosity [η] as measured in decalin at 135° C. of the propylene/ethylene copolymer thus obtained was 2.4 dl/g. The SP value was 0.94, and the glass transition temperature was −28° C. The ethylene content was 24% by mole, and the molecular weight distribution (Mw/Mn) measured by GPC was 2.9.

Example 1

70 parts by weight of the propylene/ethylene copolymer obtained in Polymerization Example 1, 30 parts by weight of syndiotactic polypropylene (homopolymer, MFR=8.3 g/10 min), and 1 part by weight of carbon black masterbatch (for black coloring) were kneaded in a twin-screw extruder maintained at 230° C., thus to obtain a thermoplastic elastomer composition (C-1). Subsequently, a laminate of the olefinic thermoplastic elastomer (A-1) and the thermoplastic elastomer composition (C-1) was obtained using a extruder for a bilayer laminate consisting of two single-screw extruders and one laminating die. Also, for the olefinic thermoplastic elastomer (A-1), the thermoplastic elastomer C-11 (a thermoplastic elastomer obtained in a Henschel mixer by sufficiently mixing 80 parts by weight of an oil extended ethylene/propylene/5-ethylidene-2-norbornene copolymer rubber [product obtained by oil extending 40 parts of a paraffinic process oil (PW-380, manufactured by Idemitsu Kosan Co., Ltd.) in 100 parts by weight of a polymer having a molar ratio of the unit derived from ethylene and the unit derived from propylene (ethylene/propylene) of 81/19, an iodine value based on ENB of 13, and Mooney viscosity ML1+4 (100° C.) of 140], 20 parts by weight of a propylene homopolymer [MFR (230° C., 2.16 kg) of 5 (g/10 min)], 0.3 part by weight of an organic peroxide [2,5-dimethyl-2,5-di-(tert-butylperoxy)hexane], and 0.5 part by weight of divinylbenzene (DVB), and then feeding the mixture to a twin-screw extruder having a screw diameter of 53 mm, maintained at 220° C., at a rate of 50 kg/h, to carry out dynamic heat treatment) was used. The laminate extrusion molded article was in a belt form, with the width being 5 cm, the thickness of the thermoplastic elastomer C-11 being 1.5 mm, and the thickness of Composition-1 being 0.5 mm.

A Japan Society for the Promotion of Science (JSPS)-type abrasion tester manufactured by Toyo Seiki Seisaku-sho, Ltd. and a specimen having a thickness of 2 mm were used. The tips of 470 g of abrasion indenter with 45 R, made of SUS was covered with cotton duck #10, and this was used to abrade the specimen at 23° C. and at a stroke of 100 mm, with the number of back and forth movement being 100 times, and the rate of back and forth movement being 33 times/min. Thus, the rate of gloss change before and after the test, ΔGloss, was determined as follows, to evaluate the scratch resistance.

ΔGloss=100×(Gloss before abrasion−Gloss after abrasion)/Gloss before abrasion

The ΔGloss under the above-described conditions was 8%.

Example 2

A laminate injection molded rectangular plate (12 cm×20 cm) was obtained from the thermoplastic elastomer composition (C-1) obtained in Example 1 and a propylene homopolymer (B-1, MFR=25 g/10 min), by sequentially injecting the propylene homopolymer (B-1) (base material, a thickness of 3 mm) and the thermoplastic elastomer composition (C-1) (skin coverage, a thickness of 1.5 mm) in this order through insert type injection molding. Subsequently, the JSPS-type abrasion test was carried out in the same manner as in Example 1, to determine the rate of gloss change, ΔGloss. The ΔGloss was 7%.

Example 3

70 parts by weight of the propylene/ethylene copolymer obtained in Polymerization Example 1, 30 parts by weight of the thermoplastic elastomer C-11 used in Example 1, and 1 part by weight of carbon black masterbatch (for black coloring) were kneaded in a twin-screw extruder maintained at 230° C., thus to obtain a thermoplastic elastomer composition (C-2).

Subsequently, the thermoplastic elastomer C-12 (a thermoplastic elastomer obtained in a Henschel mixer by sufficiently mixing 65 parts by weight of an oil extended ethylene/propylene/5-ethylidene-2-norbornene copolymer rubber [product obtained by oil extending 40 parts of a paraffinic process oil (PW-380, manufactured by Idemitsu Kosan Co., Ltd.) in 100 parts by weight of a polymer having a molar ratio of the unit derived from ethylene and the unit derived from propylene (ethylene/propylene) of 81/19, an iodine value based on ENB of 13, and Mooney viscosity ML1+4 (100° C.) of 140], 35 parts by weight of a propylene homopolymer [MFR (230° C., 2.16 kg) of 1.0 (g/10 min)], 0.2 part by weight of an organic peroxide [2,5-dimethyl-2,5-di-(tert-butylperoxy) hexyne-3], and 0.3 part by weight of divinylbenzene (DVB), and then feeding the mixture to a twin-screw extruder having a screw diameter of 53 mm, maintained at 220° C., at a rate of 40 kg/h, to carry out dynamic heat treatment) was molded into a sheet having a thickness of 0.5 mm by calendar molding. While molding the thermoplastic elastomer composition (C-2) in the same manner into a sheet having a thickness of 0.2 mm using a calendar molding machine, the two sheets were laminated by thermal lamination to obtain a molded laminate sheet product.

The JSPS-type abrasion test was carried out in the same manner as in Example 1, to determine the rate of gloss change, ΔGloss. The ΔGloss was 11%.

Example 4

With respect to Example 3, 70 parts by weight of the propylene/ethylene copolymer obtained in Polymerization Example 1 instead of the thermoplastic elastomer composition (C-2), 30 parts by weight of the thermoplastic elastomer C-11 used in Example 1, 1 part by weight of carbon black masterbatch (for block coloring), and 1.5 parts by weight of silicone oil (SH200 (trademark), manufactured by Dow Corning Toray Silicone Co., Ltd., dynamic viscosity: 3000 cSt) were kneaded in a twin-screw extruder maintained at 230° C., thus to obtain a thermoplastic elastomer composition (C-3)

Subsequently, while molding the thermoplastic elastomer C-12 into a sheet having a thickness of 0.5 mm by calendar molding, and molding the thermoplastic elastomer composition (C-3) in the same manner into a sheet having a thickness of 0.2 mm using a calendar molding machine, the two sheets were laminated by thermal lamination, to obtain a molded laminate sheet product. The JSPS-type abrasion test was carried out in the same manner as in Example 1 to determine the rate of gloss change, ΔGloss. The ΔGloss was 5%.

Comparative Example 1

With respect to Example 1, a propylene/ethylene copolymer (ethylene content: 24% by mole, [η]=2.5 dl/g) having mainly an isotactic structure was used instead of the propylene/ethylene copolymer obtained in Polymerization Example 1, to obtain a thermoplastic elastomer composition (C-4). Laminate extrusion was carried out in the same manner as in Example 1, and the rate of gloss change, ΔGloss, was determined through the JSPS-type abrasion test. The ΔGloss was 76%.

Comparative Example 2

With respect to Example 2, a propylene/ethylene copolymer (ethylene content: 24% by mole, [η]=2.5 dl/g) having mainly an isotactic structure was used instead of the propylene/ethylene copolymer obtained in Polymerization Example 1, to obtain a thermoplastic elastomer composition (C-4). Injection molding was carried out sequentially in the same manner as in Example 2, and the rate of gloss change, ΔGloss, was determined through the JSPS-type abrasion test. The ΔGloss was 71%.

Example 5

Polymerization Example 2

Synthesis of Syndiotactic Propylene/ethylene/DCPD Copolymer

To a 1.5-liter autoclave that had been dried under a reduced pressure and nitrogen-purged, 610.5 ml of heptane was added at ambient temperature, and subsequently 1.0 ml of a 1.0 mmol/ml toluene solution of triisobutylaluminum was added such that the amount in terms of aluminum atom was 1.0 mmol. 50.7 liters (25° C., 1 atmosphere) of propylene and 6.5 ml of dicyclopentadiene (DCPD) were introduced with stirring, and the temperature was elevated to reach 50° C. Then, the system was pressurized with ethylene to 7.5 kg/cm²G, and the same operation as in Synthesis Example 1 was carried out.

The intrinsic viscosity [η] of the resulting propylene/ethylene/DCPD copolymer was 1.3 dl/g. And the glass transition temperature Tg was −36° C. The ethylene content was 34% by mole, relative to 100% by mole of the sum of the propylene content and ethylene content, and the DCPD content was 1.6% by mole, relative to 100% by mole of the sum of the propylene content and ethylene content. The iodine value was 10.3 g/100 g, the SP value was 0.92, and the molecular weight distribution (Mw/Mn) was 2.2. Tm was not observed.

60 parts by weight of the propylene/ethylene/DCPD copolymer obtained in Polymerization Example 2, 40 parts by weight of a syndiotactic polypropylene (homopolymer, MFR=5.5 g/10 min), 1 part by weight of carbon black masterbatch (for black coloring), 0.2 part by weight of 2,5-dimethyl-2,5-di-(tert-butylperoxy)hexane (as a crosslinking agent), and 0.4 part by weight of divinylbenzene (as a crosslinking aid) were mixed sufficiently with a high speed mixer, and then the mixture was subjected to dynamic crosslinking in a twin-screw extruder maintained at 200° C., to obtain a thermoplastic elastomer composition (C-5). Subsequently, a laminate of the olefinic thermoplastic elastomer (A-1) and the thermoplastic elastomer composition (C-5) was obtained in the same manner as in Example 1.

The rate of gloss change, ΔGloss, was determined through the JSPS-type abrasion test in the same manner as in Example 1. The ΔGloss was 5%.

Comparative Example 3

With respect to Example 5, a propylene/ethylene/DCPD copolymer (ethylene content: 35% by mole, DCPD content was 1.6% by mole, relative to 100% by mole of the sum of the propylene content and ethylene content, the iodine value was 10.0 g/100 g, and molecular weight distribution (Mw/Mn) was 2.4) having mainly an isotactic structure was used instead of the propylene/ethylene/DCPD copolymer obtained in Polymerization Example 2, and a thermoplastic elastomer composition (C-6) was obtained in the same manner as in Example 5. Subsequently, a laminate of the olefinic thermoplastic elastomer (A-1) and the thermoplastic elastomer composition (C-6) was obtained in the same manner as in Example 1.

The rate of gloss change, ΔGloss, was determined through the JSPS-type abrasion test in the same manner as in Example 1. The ΔGloss was 66%.

For the above-described Examples and Comparative Examples, the JSPS-type abrasion test was conducted to wear the layers of the thermoplastic elastomer compositions (C-1) through (C-6) of the respective specimens, and thus the scratch resistance was evaluated.

The MFR of the propylene homopolymer and the propylene copolymers was a value measured at 230° C. under a load of 2.16 kg, while [η] was the intrinsic viscosity measured in decalin at 135° C.

The invention claimed is:

1. A multilayered laminate composed of two or more layers, having a structure in which a layer (I) comprising an olefinic thermoplastic elastomer composition (A), and a layer (II) comprising an olefinic thermoplastic elastomer composition (C) are laminated,
wherein the olefinic thermoplastic elastomer composition (A) is an olefinic thermoplastic elastomer composition containing an olefinic resin (a) and an ethylenic copolymer rubber (b), and
the olefinic thermoplastic elastomer composition (C) is an olefinic thermoplastic elastomer composition containing the following [1] and [2],
wherein [1] is a syndiotactic polypropylene copolymer (c) containing
(c-1) a repeating unit derived from propylene, and
(c-2) a repeating unit derived from at least one olefin selected from olefins having 2 to 20 carbon atoms excepting propylene,
such that the copolymer (c) contains 99 to 50% by mole of unit (c-1) and 1 to 50% by mole of unit (c-2) when the total amount of unit (c-1) and unit (c-2) is 100% by mole,
and optionally, further containing
(c-3) a repeating unit derived from polyene in an amount of 0 to 30% by mole, relative to 100% by mole of the total amount of unit (c-1) and unit (c-2),
and having a crystallinity degree of less than 20% as obtained by X-ray diffraction, and a substantially syndiotactic structure, while
[2] is at least one selected from a polypropylene resin (d) having a crystallinity degree of 20% or greater as obtained by X-ray diffraction, and an olefinic thermoplastic elastomer (e).

2. The multilayered laminate according to claim 1, wherein the syndiotactic propylene copolymer (c) is at least partially crosslinked.

3. The multilayered laminate according to claim 1 wherein the syndiotactic propylene copolymer (c) in the state prior to crosslinking has an intrinsic viscosity in the range of 0.1 to 10 dl/g as measured in decalin at 135° C., a molecular weight distribution of 4 or less as determined by gel permeation chromatography, and a glass transition temperature of 30° C. or lower.

4. The multilayered laminate according to claim 1, wherein the syndiotactic propylene copolymer (c) is obtained in the presence of at least one catalyst system, which comprises
(A) a transition metal complex represented by the following Formula (I) or (II), and
(B) at least one compound selected from
(B-1) a compound capable of reacting with the transition metal of (A) above and forming an ionic complex,
(B-2) an organic aluminum oxy compound, and
(B-3) an organic aluminum compound,

wherein in the formulas (I) and (II), M represents Ti, Zr, Hf, Rn, Nd, Sm or Ru; $Cp^1$ and $Cp^2$ represent a cyclopentadienyl group, an indenyl group, a fluorenyl group, or a derivative group thereof, which is π-bonded to M; $X^1$ and $X^2$ represent an anionic ligand or a neutral Lewis base ligand; Y is a ligand containing a nitrogen atom, an oxygen atom, a phosphorus atom or a sulfur atom; and Z represents a C, O, B, S, Ge, Si or Sn atom, or a group containing such atom.

5. The multilayered laminate according to claim 1, wherein the polypropylene resin (d) has a substantially syndiotactic structure.

6. The multilayered laminate according to claim 1, wherein the ethylenic copolymer rubber (b) is crosslinked.

7. The multilayered laminate according to claim 1, wherein the layer (I) comprising the olefinic thermoplastic elastomer composition (A) is a base layer, and the layer (II) comprising the olefinic thermoplastic elastomer composition (C) is a surface layer.

8. The multilayered laminate according to claim 1, wherein component [2] of the olefinic thermoplastic elastomer composition (C) is a polypropylene resin (d) having a crystallinity degree of 20% or greater as obtained by X-ray diffraction, and an olefinic thermoplastic elastomer (e).

9. The multilayered laminate according to claim 1, which further contains 0.1 to 5 parts by weight of silicone oil relative to 100 parts by weight of the olefinic thermoplastic elastomer composition (C).

* * * * *